(12) United States Patent
Faulkner

(10) Patent No.: US 7,076,900 B2
(45) Date of Patent: Jul. 18, 2006

(54) LOCKING PLANT TAG

(75) Inventor: Willard M. Faulkner, Montgomery, AL (US)

(73) Assignee: The John Henry Company, Lansing, MI (US)

( * ) Notice: Subject to any disclaimer, the term of this patent is extended or adjusted under 35 U.S.C. 154(b) by 0 days.

(21) Appl. No.: 11/001,747

(22) Filed: Dec. 2, 2004

(65) Prior Publication Data

US 2006/0117628 A1    Jun. 8, 2006

(51) Int. Cl.
*G09F 23/00* (2006.01)
(52) U.S. Cl. ............................. 40/645; 40/653; 47/66.6
(58) Field of Classification Search ................ 40/645, 40/649, 653, 324; D8/1; 248/156; D6/1; 24/30.5 S, 30.5 P, 30.5 W; 47/66.6
See application file for complete search history.

(56) References Cited

U.S. PATENT DOCUMENTS

| 4,027,410 A | | 6/1977 | Wheeler | |
| 4,972,616 A | * | 11/1990 | Doll | 40/645 |
| D343,775 S | * | 2/1994 | Steen | D8/1 |
| 5,575,107 A | | 11/1996 | Doerr | |
| D402,863 S | * | 12/1998 | Hickmott | D8/1 |
| 6,105,293 A | * | 8/2000 | Eason et al. | 40/645 |
| 6,131,323 A | * | 10/2000 | Wong et al. | 40/645 |
| 6,199,319 B1 | * | 3/2001 | Skinner | 47/66.6 |
| 6,401,375 B1 | | 6/2002 | Hickmott | |

FOREIGN PATENT DOCUMENTS

| AU | B5291190 | | 10/1990 |
| EP | 502281 A1 | * | 9/1992 |
| WO | WO9317412 | | 9/1993 |

* cited by examiner

*Primary Examiner*—Gary C. Hoge
(74) *Attorney, Agent, or Firm*—Price, Heneveld, Cooper, DeWitt & Litton, LLP

(57) ABSTRACT

A polymeric tag has a body and an integral insertion leg which is tapered to facilitate insertion either into the soil or into a slot formed in the edge of a pot. Spaced from the end on each edge of the leg and in alignment with one another along the longitudinal length of the leg are convex outwardly extending projections immediately adjacent a symmetrical concave indentation on a side proximate the tag body. The combination of the curvilinear convex projections and concave indentations provides an easily insertable mechanism for allowing the insertion of the tag into the slot of a pot, and, once the convex projection clears the edge of the slot, the tag is locked in position with the concave indentation engaging the edges of the slot and the convex projection extending beyond the edge of the slot and engaging the underside of the pot rim.

19 Claims, 2 Drawing Sheets

US 7,076,900 B2

LOCKING PLANT TAG

BACKGROUND OF THE INVENTION

The present invention relates to plant tags and particularly to polymeric tags which can be lockably inserted into a plant pot.

There exists numerous plant tags or stakes made of polymeric material which include a body carrying either a photograph of a plant and/or plant care instructions for the plants with which the tags are employed. Such tags typically include a body and an integral tapered leg extending from the body for insertion of the tag into the plant soil. One such plant tag is disclosed in U.S. Pat. No. 4,027,410.

Recently, plants have been sold at retail in relatively thin polymeric pots which include a rim with slots for receiving plant tags directly in the pot as opposed to the soil. Tags used with such pots typically include notches along opposite edges of the extending legs of the tag, such as disclosed in Australian Patent No. AU-B-52911/90, PCT Publication WO 93/17412, and in FIG. 4B of U.S. Pat. No. 5,575,107. These designs more securely attach the tag to the pot, minimizing the loss of the tag from an associated plant when being moved by either retail personnel or customers when making a selection for purchasing. Although these tags successfully lock the tag to the pot due to their design, they are somewhat difficult to insert as well as remove when desired. An improved locking tag is disclosed in U.S. Pat. No. 6,401,375. This tag includes a trapezoidal deflectable tab in the center of the leg which allows lockable insertion of the tag into a slot within a pot rim and also helps anchor the tag within the soil around a plant. Although such tag represents an improvement to existing locking tags, it is somewhat more expensive due to the forming of the deflectable locking tab.

Accordingly, there remains a need for a plant tag which can be lockably inserted into the slot of a plant pot relatively easily and which, although securely held within the pot, can also be easily removed by the purchaser when the plant is taken home.

SUMMARY OF THE INVENTION

The tag of the present invention satisfies this need by providing a polymeric tag having a body and an integral extending insertion leg which is tapered to facilitate insertion either into the soil or into a slot formed in the edge of a pot. The extending leg includes opposed tapered edges terminating in a generally pointed end. Spaced from the end on each edge of the leg and in alignment with one another along the longitudinal length of the leg are convex (i.e., outwardly extending) projections. Immediately adjacent the convex projections are symmetrical concave indentations on the edges of the leg on a side proximate the tag body. The combination of the curvilinear convex projections and concave indentations provides an easily insertable mechanism for allowing the insertion of the tag into the slot of a pot, and, once the convex projection clears the edge of the slot, the tag is locked in position with the concave indentation engaging the edges of the slot and the convex projection extending beyond the edge of the slot and engaging the underside of the pot rim, thereby holding the tag in position. The projections and indentations are generally curvilinear to facilitate the insertion and removal of the tag and are dimensioned to provide sufficient holding force for securely holding the tag to the plant pot. The tag is relatively inexpensive to manufacture and can be die cut from sheets of polymeric material and imprinted with a photograph of a plant and/or care instructions for a particular plant with which the tag will be employed.

These and other features, objects and advantages of the present invention will become apparent upon reading the following description thereof together with reference to the accompanying drawings.

DETAILED DESCRIPTION OF THE PREFERRED EMBODIMENT

Figure 1:
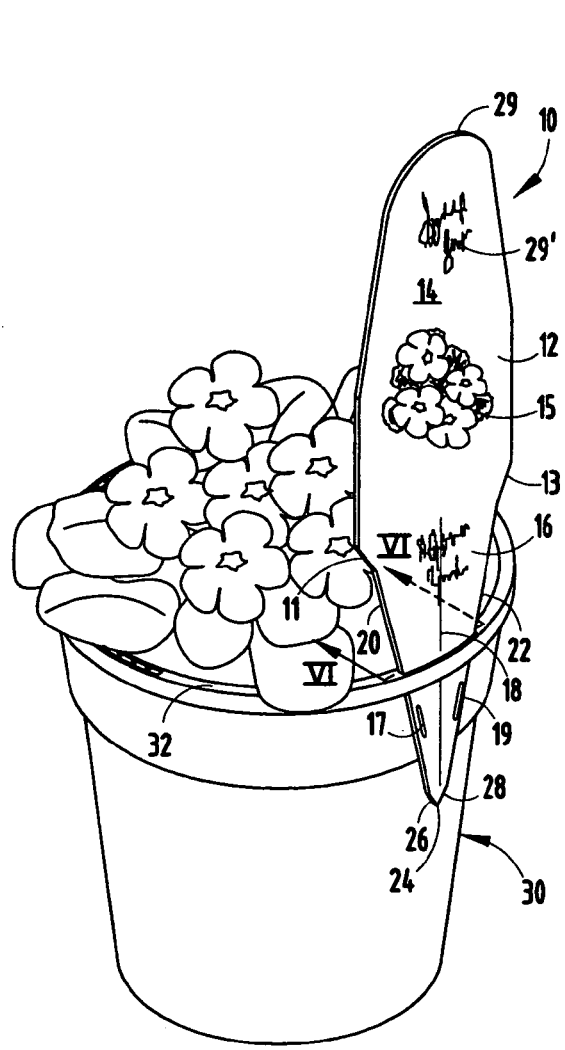
FIG. 1 is a perspective view of a plant tag of the present invention inserted into a pot.
Figure 2:
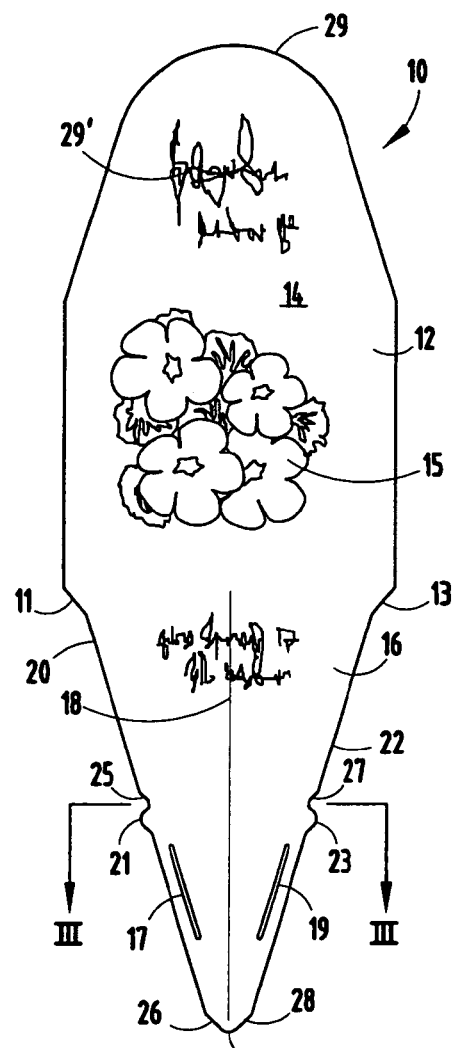
FIG. 2 is an enlarged front elevational view of a tag embodying the present invention.
Figure 3:
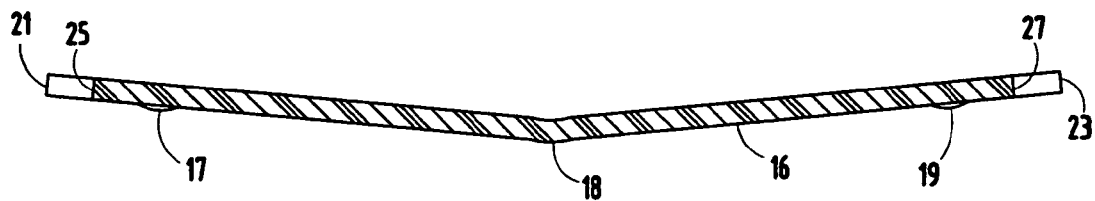
FIG. 3 is an enlarged cross-sectional view of the leg of the plant tag, taken along section lines III—III of FIG. 2.

Referring initially to FIGS. 1 and 2, there is shown a plant tag 10 embodying the present invention. Tag 10 is made from a polymeric material, preferably stamped and die cut from a sheet of such material in an integral manufacturing process. Tag 10 includes a central body 12, which typically carries on a front surface 14 thereof a depiction 15, such as a photograph of a plant with which the tag is associated. The tag may also include printed information at area 16, such as care instructions for the plant including, for example, lighting and watering instructions for successfully growing the plant. Integral with the plant body 12 is an insertion leg 16, which includes downwardly, and inwardly projecting edges 20 and 22 terminating at an end 24.

Figure 5:
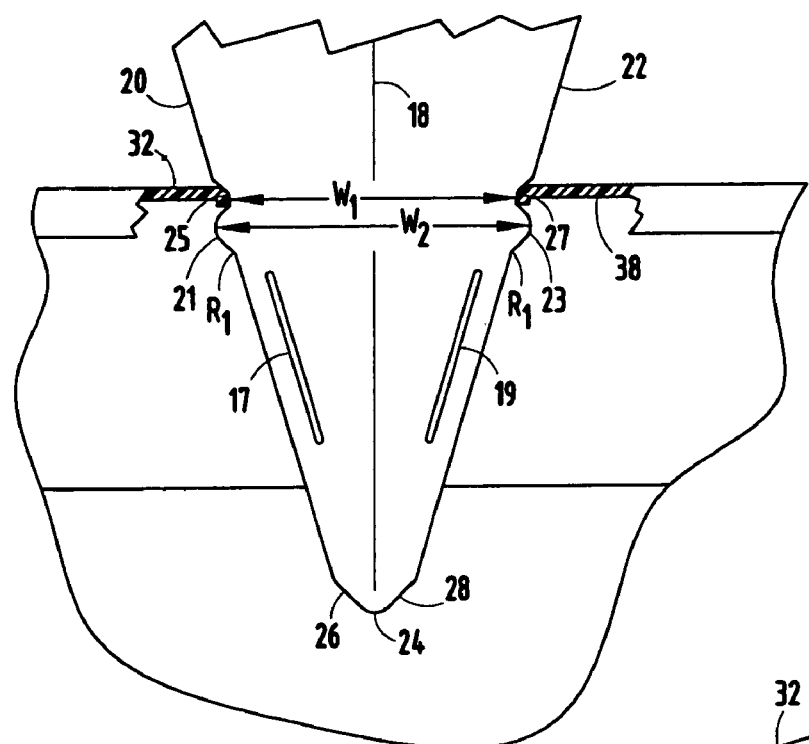
FIG. 5 is a fragmentary, partly broken away, view of the tag and pot shown in FIG. 1, showing the locking mechanism engaging the under edge of the pot rim.
Figure 6:
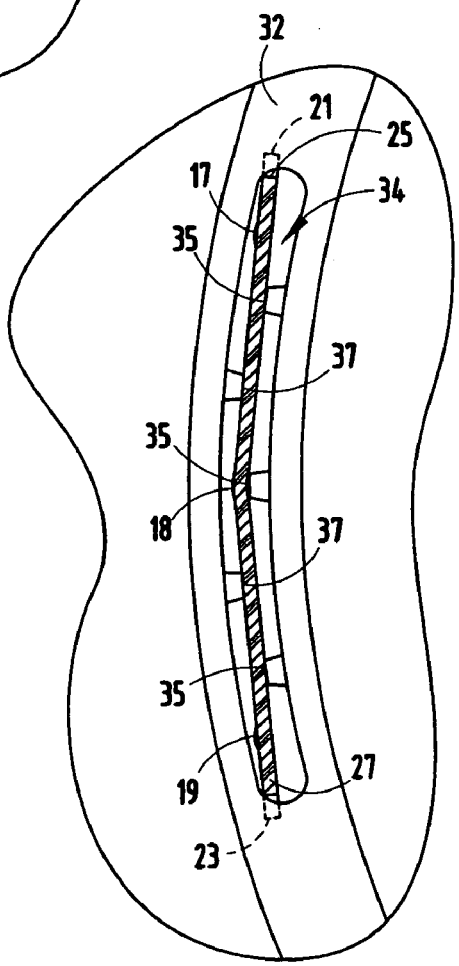
FIG. 6 is an enlarged cross-sectional view of the tag and pot taken along section line VI—VI of FIG. 1.

The end may be a pointed tip formed by a pair of 45° angled edges 26 and 28. Positioned in spaced relationship to end 24 on each of the edges 20 and 22 of leg 16 are aligned convex outwardly curved projections 21 and 23 which project outwardly from the edges 20 and 22 and are immediately followed by contiguous inwardly convexly curved indentations 25 and 27, which together form an insertion and locking mechanism for inserting the tag into a pot, as shown in FIGS. 1, 5 and 6. The locking mechanism is described in greater detail in connection with FIGS. 5 and 6 below. Insertion leg 16 of the tag may also include a reinforcing indentation line 18 along the longitudinal center line of the leg for strengthening the leg as well as a pair of indentations 17 and 19 on opposite sides of indentation 18 for strengthening the area immediately around the projections 21 and 23 and indentations 25 and 27. The integral tag 10 may be formed of a resilient polymeric material, such as 19.5 point high impact polystyrene, polyvinyl chloride or other suitable moisture-resistant material having a thickness of from about 15 to about 22 mils.

Figure 4:
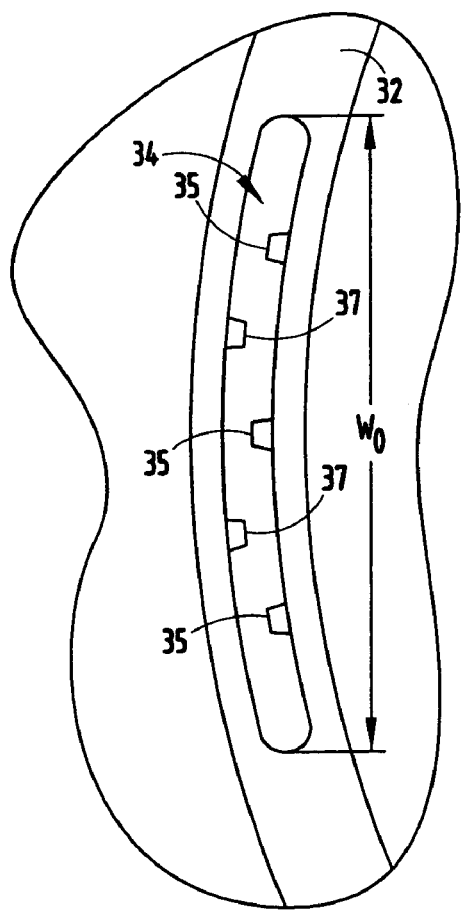
FIG. 4 is an enlarged fragmentary top plan view of the rim of the pot showing the tag receiving slot.

The tag is employed in connection with a pot 30, as shown in FIG. 1, which includes an upper rim 32 having an arcuate slot 34 (FIG. 4) formed therein at conveniently spaced locations around the rim. Pot 30 may, therefore, include more than one slot for the insertion of a tag 10 of the present invention. The slot 34 has an arcuate width $W_0$ shown in FIG. 4 which is substantially the same width as $W_1$ between the bottoms of indentations 25 and 27 shown in FIGS. 5 and 6. The slot 34 may include opposed alternately staggered projections 35 and 37, as also seen in FIG. 4, for assisting in holding the tag within the slot 34. Tag 10 is inserted in the pot by extending the end 24 through slot 34 and pushing downwardly until the convexly curved projections 21 and 23 extend through the slot and, as seen in FIGS. 1 and 5, engage the lower surface 38 of rim 32 of the pot.

In a preferred embodiment of the invention, the projections had a 0.048 inch radius of curvature (about 0.05 inch) and projected outwardly at about 0.039 inches. The indentations also had a 0.048 inch radius of curvature and projected inwardly also a distance of 0.039 inches. The projections 21, 23 were spaced from end 24 approximately 1.34 inches for a tag having an overall length of 6.125 inches, while the center line of indentations 25, 27 was 1.426 inches from end 24. The tag body is joined to leg 16 by tapered edges 1 and 13 (FIG. 2), which are cut at a 45° angle to the tag body 12. Body 12 also includes a curved upper end 29 to provide an upper display area 29' which may include the store name and/or logo associated with the retail establishment selling plants contained in the pot and with which the tag is associated. In one embodiment where the overall length of tag 10 was 6.125 inches, the maximum width of body 12 was 2 inches. The insertion radius of curvature ($R_1$ in FIG. 5) was 0.156 inches to provide a smooth curve for the admission of leg 16 into slot 34. The smaller radii of curvature (0.048 inches) of projections 21, 23 and indentations 25, 27 securely hold the tag within slot 34 against inadvertent removal and yet allows removal by the conscious action of the purchaser. In this embodiment, the locking mechanism defined by elements 21, 23, 25, and 27 were located about 1.4 inches from end 24 in the about 2.5 inch long leg 16 or about 56-percent of the length of leg 16 from the body 12 of tag 10. Thus, the locking mechanism is located about midway along leg 16.

As can be appreciated, the dimensions of the tag can be varied to meet the requirements of given pot dimensions which may have different sized slots. It is important that the dimension $W_2$ (FIG. 5) corresponding to the width of leg 16 at the outer edge of projections 21 and 23 is greater than the arcuate width $W_0$ of the slot 34 with which the pot is employed and that the width $W_1$ is substantially equal to or slightly greater than the length of the arcuate slot, such that the tag will be securely held within the slot, as shown in FIGS. 1, 4, and 5. By providing the adjacent curvilinear projections 21 and 23 and the substantially symmetrical curvilinear indentations 25 and 27 a positive locking mechanism is provided which provides relative ease of insertion into the tag into the slot on the pot rim and yet holds the tag securely to the pot. The curvilinear nature of indentations 21 and 23 subsequently allow the tag 10 to be removed without excessive difficulty by the purchaser. Subsequently, the tag 10 can be placed in the ground if the potted plant is subsequently planted in a garden. The pointed end 24 and indentations 17–19 provide sufficient rigidity for such use of the tag.

It will become apparent to those skilled in the art that various modifications to the preferred embodiment of the invention, such as the dimensions given and the exact location of the projections 21 and 23 and indentations 25 and 27 along the longitudinal center line of the tag, can be made without departing from the spirit or scope of the invention as defined by the appended claims.

The invention claimed is:

1. A plant tag comprising:
a tag body; and
an elongated leg integrally extending from said tag body for inserting the plant tag into one of soil and a pot, said leg including inwardly converging edges terminating at an end remote from said body and wherein said edges each include a curvilinear convex projection extending outwardly from said edge and located about midway along the length of said leg and immediately adjacent said convex projection a concavely formed indentation on a side proximate said tag body and symmetrical along an axis orthogonal to the axis of said edge with said convex projection, wherein said projections and indentations define a locking mechanism for releasably holding said tag within a receiving slot formed in a rim of a pot.

2. The plant tag as defined in claim 1 wherein said convex projections and said concave indentations each have a radius of curvature of about 0.05 inch.

3. The plant tag as defined in claim 2 wherein said convex projections present an insertion radius of curvature of about 0.156 inch.

4. The plant tag as defined in claim 2 wherein said end includes a pair of 45° chamfers to form a pointed tip.

5. The plant tag as defined in claim 4 wherein said tag is made of a high impact polystyrene material.

6. The plant tag as defined in claim 5 wherein said leg includes reinforcing indentations extending longitudinally in the area of said projections and indentations.

7. A pot and tag for a live plant comprising:
a pot including a rim having a horizontally extending surface with an arcuate slot formed therein; and
an elongated leg integrally extending from said tag body for inserting the plant tag into one of soil and a pot, said leg including inwardly converging edges terminating at an end remote from said body and wherein said edges each include a curvilinear convex projection extending outwardly from said edge and located about midway along the length of said leg and immediately adjacent said convex projection a concavely formed indentation on a side proximate said tag body and symmetrical along an axis orthogonal to the axis of said edge with said convex projection, wherein said projections and said indentations define a locking mechanism for releasably holding said tag within said slot of said pot, such that said projections engage an undersurface of said rim immediately adjacent edges of said slot when said leg of said plant tag is inserted into said slot of said pot.

8. The plant tag as defined in claim 7 wherein said convex projections present an insertion radius of curvature of about 0.156 inch.

9. The plant tag as defined in claim 8 wherein said convex projections and said concave indentations have a radius of curvature of about 0.05 inch.

10. The plant tag as defined in claim 9 wherein said tag is made of a polymeric material which has a thickness of from about 17 mil to about 22 mil.

11. The plant tag as defined in claim 10 wherein said leg includes reinforcing indentations extending longitudinally in the area of said projections and indentations.

12. The plant tag as defined in claim 11 wherein said end includes a pair of 45° chamfers to form a pointed tip.

13. A plant tag comprising:
a body;
an elongated insertion leg integrally extending from said body for inserting the plant tag into one of soil and a pot, said insertion leg including inwardly converging edges terminating at an end and wherein said edges each include a curvilinear convex projection extending outwardly from said edge in spaced relationship from said end; and a concavely formed indentation in each of such edges, which indentations are symmetrical with said convex projection along said edge, said indentations located immediately adjacent said projection on a side proximate said body to define a locking mechanism located about midway along said leg for holding said tag within a receiving slot formed in a rim of a pot wherein said projections and indentations have a radius of curvature of about 0.05 inch and said convex projections present an insertion radius of curvature of about 0.156 inch.

14. The plant tag as defined in claim 13 wherein said projections extend outwardly about 0.039 inch.

15. The plant tag as defined in claim 14 wherein said leg includes reinforcing indentations extending longitudinally in the area of said projections and indentations.

16. The plant tag as defined in claim 15 wherein the tag is made of a polymeric material.

17. The plant tag as defined in claim 16 wherein said polymeric material has a thickness of from about 17 mil to about 22 mil.

18. The plant tag as defined in claim 17 wherein said polymeric material is high impact polystyrene.

19. The plant tag as defined in claim 18 and a pot, wherein said pot includes a rim having at least one slot for lockably receiving said projections of said insertion leg.

\* \* \* \* \*